No. 848,532. PATENTED MAR. 26, 1907.
E. D. BOND.
HORSE HAY RAKE.
APPLICATION FILED APR. 12, 1906.
3 SHEETS—SHEET 1.
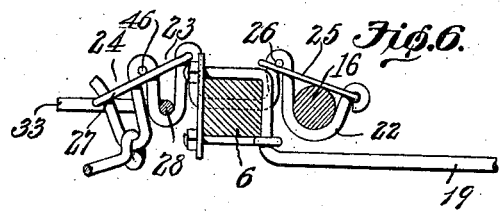
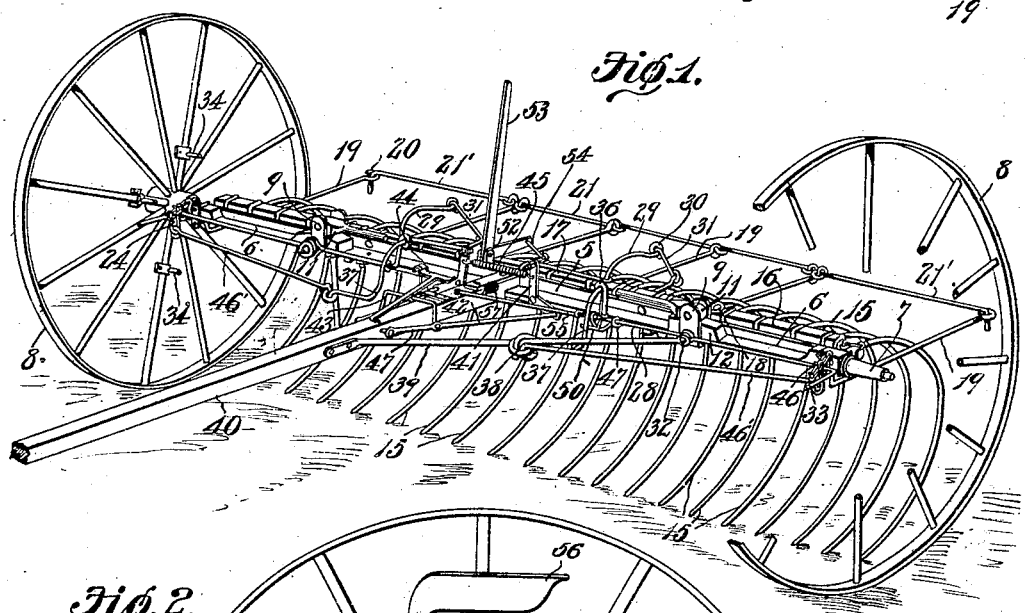
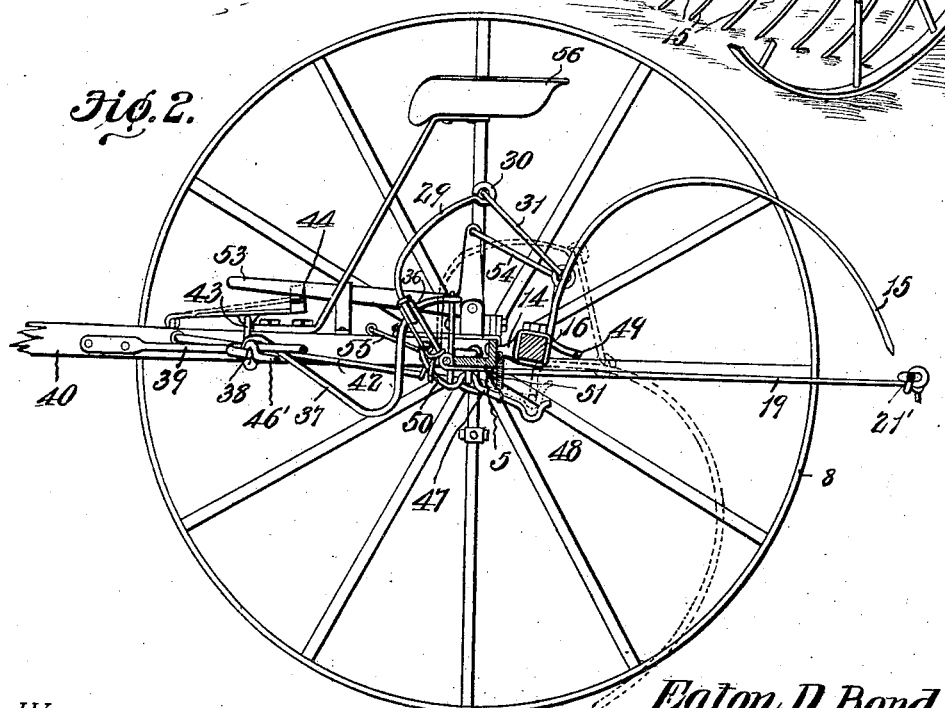
WITNESSES:
Eaton D. Bond,
INVENTOR
By C. A. Snow & Co.
ATTORNEYS

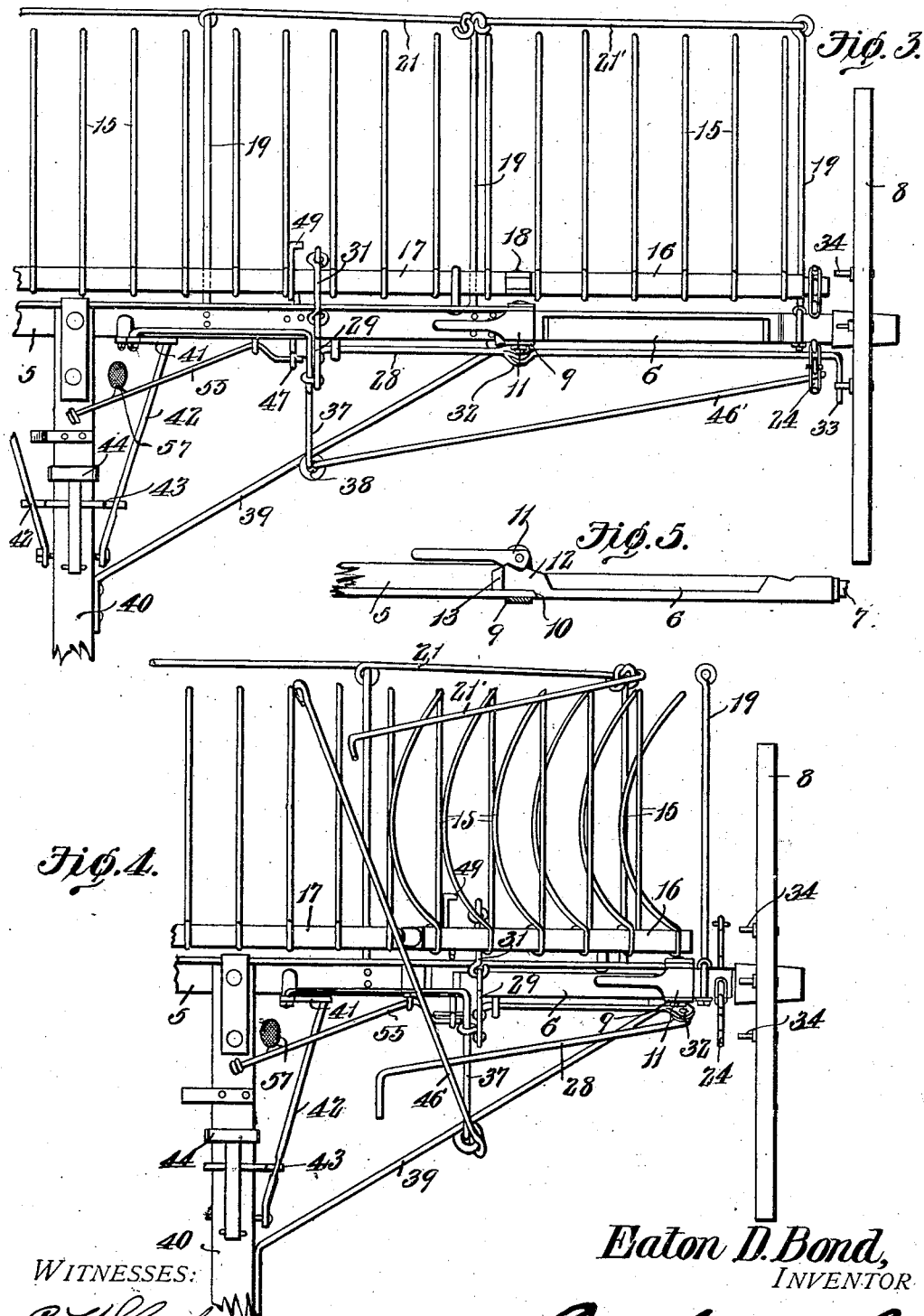

No. 848,532. PATENTED MAR. 26, 1907.
E. D. BOND.
HORSE HAY RAKE.
APPLICATION FILED APR. 12, 1906.
3 SHEETS—SHEET 3.
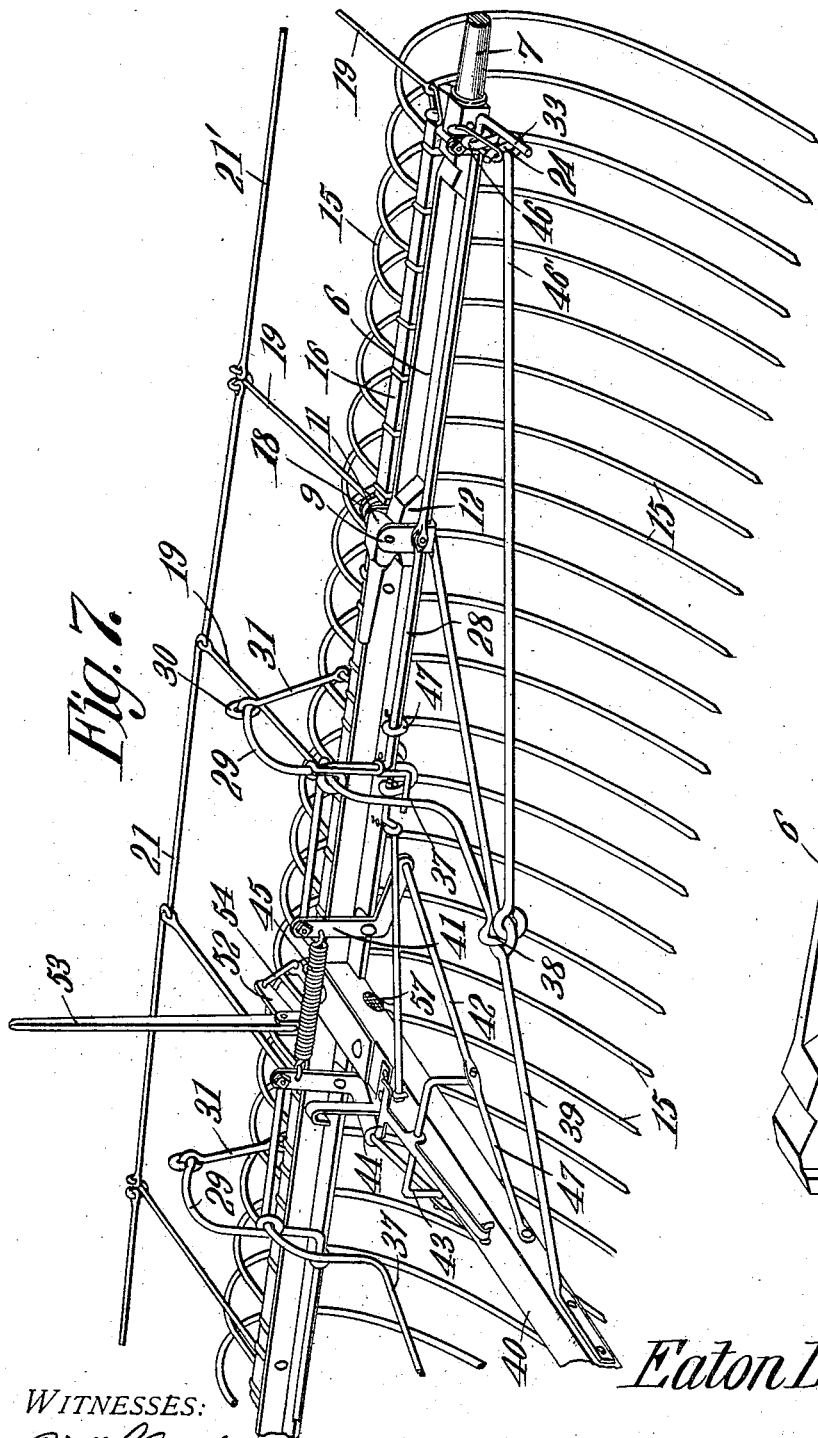
Eaton D. Bond,
INVENTOR.
WITNESSES:
By C. A. Snow & Co.
ATTORNEYS

UNITED STATES PATENT OFFICE.

EATON DAWSON BOND, OF MERCER, TENNESSEE.

HORSE HAY-RAKE.

No. 848,532.  Specification of Letters Patent.  Patented March 26, 1907.

Application filed April 12, 1906. Serial No. 311,311.

*To all whom it may concern:*

Be it known that I, EATON DAWSON BOND, a citizen of the United States, residing at Mercer, in the county of Madison and State of Tennessee, have invented a new and useful Horse Hay-Rake, of which the following is a specification.

This invention relates to horse-rakes, and has for its object to provide improved means for automatically effecting the dumping of the rake at predetermined intervals.

A further object of the invention is to provide means operable independently of the automatic means for manually dumping the rake and means for locking the rake in lowered or operative position.

A further object is to provide a plurality of longitudinal slide-bars adapted to engage tappets on the traction-wheels to effect the dumping of the rake, said bars being provided with trips adapted to engage and release the locking mechanism when the bars are moved to operative position.

A further object is to provide an extensible axle having a sectional rake-head secured thereto and foldable in the direction of the length of the rake.

A still further object of the invention is to generally improve this class of devices, so as to increase their utility, durability, and efficiency.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a perspective view of a horse-rake constructed in accordance with my invention. Fig. 2 is a transverse sectional view showing the teeth of the rake-head in elevated position. Fig. 3 is a plan view of a portion of the rake. Fig. 4 is a similar view showing one of the pivoted rake-sections in folded position. Fig. 5 is a side elevation, partly in section, of one end of the extensible axle. Fig. 6 is a transverse sectional view of one end of the axle, showing the construction of the supporting-clip. Fig. 7 is an enlarged detail perspective view of a portion of the rake. Fig. 8 is a perspective view of a portion of one of the stub-axles.

Similar numerals of reference indicate corresponding parts in all of the figures of the drawings.

The improved device comprises an extensible axle, preferably formed of angle-iron, as shown, and comprising a relatively stationary intermediate section 5 and movable end sections or stub-axles 6, provided with terminal spindles 7, upon which are journaled the traction-wheels 8. The movable sections 6 are slidably mounted in guiding-clips 9 and are provided with offset portions forming inclined shoulders 10, adapted to engage the adjacent ends of the stationary sections 5.

Pivotally mounted for swinging movement in the clips 9 are cams 11, adapted to engage the thickened portion 12 of the movable section for locking the shoulders 10 in engagement with the ends of the stationary section, there being lugs 13 extended laterally from the sections 6 and adapted to engage the clips 9 for limiting the sliding movement of said sections. It will thus be seen that by adjusting the movable sections longitudinally of the intermediate sections 6 the length of the axle may be varied at will, the movable sections being locked in adjusted position by actuating the cam 11, as will be readily understood.

Pivotally mounted for rotation in suitable bearing-brackets 14 is a rake-head provided with depending downwardly-curved teeth 15, said rake-head being formed in a plurality of sections, the end sections 16 of which are pivotally connected to the intermediate section 17 by means of pins or bolts 18. By having the rake-head formed in sections, as shown, the terminal sections 16 may be readily folded laterally on the intermediate section when the extensible axle is adjusted, thus permitting the rake to pass between gate-posts or other obstructions without danger of contact with the same.

Extending from the axle are lateral supports 19, provided with terminal loops 20, and engaging said loops are connecting bars or rods 21. The connecting-bar 21' is formed with a terminal hook adapted to detachably engage the eye in the adjacent supporting-bar 19, whereby said connecting-bar may be readily removed when it is desired to fold the movable sections of the rake-head.

Secured to the opposite ends of the extensible axle are supporting-clips, each preferably formed of a single piece of wire or other material having one end thereof bent to form a terminal loop or bearing 22 for the reception of the reduced end of the adjacent foldable rake-sections, while the opposite end of the wire is bent to form a pair of spaced loops 23 and 24, disposed at the front of the axle, as shown. The reduced ends of the movable rake-sections are held in the loop or bearings 22 by means of pivoted links 25 and locking-pins 26, there being similar locking-links 27 engaging the loops 23 and 24, as shown.

Mounted for longitudinal movement at the front of the extensible axle are slide-bars 28, each having one end thereof bent upwardly and rearwardly to form a yoke 29, the free end of which is provided with a terminal eye 30, connected, through the medium of a link 31, with the intermediate section of the rake-head. The slide-bars 28 are each preferably formed in two sections, pivotally united at 32, the outer section of each bar being provided with a terminal angularly-disposed extension or crank 33, adapted to engage suitable tappets or bolts 34, secured to the hub or spokes of the traction-wheels, as shown, so that the tappets 34 will engage and partially rotate the slide-bars, and, through the medium of the yoke 29 and connecting-link 31, raise the rake-head to elevated or operative position, and thereby dump the load, as will be more fully explained hereinafter. The yoke 29 is provided with a loop 36, through which extends a guide-bar 37, the latter being pivotally connected at 38 to a diagonal brace 39, which connects the tongue 40 with the axle, as shown.

The guide-bars 37 are preferably disposed one on each side of the tongue 40 and are each connected to one leg of the bell-crank levers 41, the opposite legs of which are connected, through the medium of rods 42, with a connecting-yoke 43, disposed beneath a foot-operated lever 44, there being a coiled spring 45 interposed between the arms of the bell-crank levers for normally holding the slide-bars in retracted or inoperative position. It will thus be seen that by depressing the foot-levers 44 the bell-crank levers will be tilted on their pivotal axes, and thus move the yokes 29 and slide-bars 28 longitudinally of the axle, so that the terminal cranks 33 of said bars will extend in the path of movement of the bolts 34, and in which position they will be partially rotated to effect the dumping of the rake, as before stated. The hooked ends or cranks of the slide-bars 28 engage the loops 23 of the supporting-clips and are locked in said loops by links 23 and locking-pins 46, as best shown in Fig. 6 of the drawings.

Pivotally mounted in eyes or loops 38 are braces 46', adapted to engage the loops 24 when the axle is extended, and thus assist in strengthening and reinforcing the same. Pivoted to the bottom of the stationary section of the axle is a locking member 47, one end of which is provided with a terminal hook 48, adapted to engage a lug or projection 49 on the rake-head and lock the latter in lower or operative position, while the opposite end of said locking member projects upwardly at the front of the axle and is disposed in the path of movement of a depending crank-arm 50, secured in any suitable manner to one of the yokes 29. It will thus be seen that the initial upward movement of the rake-head will cause the crank-arm 50 to engage and depress the adjacent end of the locking member 47, thus releasing the lug 49 from engagement with the hook 48, so as to permit the rake to move in a vertical plane, and thus effect the dumping of the hay, grass, or other material collected by the teeth. Secured to the axle is one end of a coil-spring 51, the opposite end of which is connected to the locking member 47, so as to normally exert an upward pull on said member and hold the hooked end 48 thereof in elevated or operative position.

Pivotally mounted at 52 is a hand-operated lever 53, connected, through the medium of a link 54, with the stationary section of the rake-head, so that by operating the lever 53 the rake may be dumped independently of the automatic mechanism.

In order to permit the manual dumping of the rake, there is provided a bar or rod 55, one end of which is operatively connected with the adjacent end of the locking member 47, while the opposite end thereof is secured to the tongue 40 at a point adjacent the seat 56, so that by depressing the terminal foot-piece 57 of the rod 55 the locking member 47 may be actuated to release the rake-head, and thus permit the latter to be elevated by the hand-lever 53.

The operation of the device is as follows: When it is desired to dump the rake, the foot-lever 44 is depressed, which causes the slide-bars 28, through the medium of the bell-crank levers 41, yokes 29, and connecting-links, to be extended longitudinally in the path of movement of the bolts or tappets 34, so that the movement of the traction-wheels will partially rotate said bars and through the several connections elevate the rake-head to operative position. The initial upward movement of the rake-head will release the locking-lever 47, and thus permit the rake-head to move vertically to the full extent of its upward movement. As soon as the crank-arms 33 clear the tappets 34 the tension of the spring 45 will automatically withdraw the slide-bars 28, and thus permit the rake-head to return to lowered or normal position, and in which position it will be locked by engagement of the lug 49 with the hook 48.

When it is desired to regulate the width of the rake, the cams 11 are moved to vertical position and the terminal sections of the stub-axles moved longitudinally until the desired adjustment is effected, after which the locking-cams are depressed and the hooks 21' released from the eyes 20, so as to permit the end sections of the rake-head to be folded rearwardly on the adjacent stationary section, as best shown in Fig. 4 of the drawings.

From the foregoing description it is thought that the construction and operation of the device will be readily understood by those skilled in the art, and further description thereof is deemed unnecessary.

Having thus described the invention, what is claimed is—

1. In a horse-rake, an extensible axle, a sectional rake-head carried by the axle, spaced supports projecting rearwardly from the axle and extending beneath the rake-head, and rods connecting the free ends of the supports.

2. In a horse-rake, an extensible axle, a sectional rake-head carried by the axle and movable vertically to dumping position, supports projecting rearwardly from the axle and extending beneath the rake-head, rods connecting the free ends of the supports, and means for locking the axle in extended position.

3. In a horse-rake, an extensible axle comprising relatively stationary and movable angle-bars, clips carried by the stationary bar, lugs secured to the movable bar and adapted to engage the clips for limiting the extensible movement of the axle, a sectional rake-head carried by the axle, supports projecting rearwardly from the axle and extending beneath the rake-head, and rods pivotally connected to the free ends of the supports.

4. In a horse-rake, an axle, a rake-head carried by the axle, a hook extending from the axle for locking the rake in operative position, and means for releasing the hook to permit the dumping of the rake.

5. In a horse-rake, an axle, a rake-head carried by the axle, a hook pivotally mounted on the axle for locking the rake in operative position, and means for simultaneously releasing the hook and elevating the rake to dumping position.

6. In a horse-rake, an axle, a rake-head carried by the axle, and slide-bars operatively connected with the rake-head and provided with terminal crank-arms adapted to engage the wheels of the axle to effect the dumping of the rake.

7. In a horse-rake, a sectional axle provided with traction-wheels, a rake-head carried by the axle, tappets secured to the wheels of the axle, slide-bars mounted on the axle and provided with terminal crank-arms adapted to engage the tappets, and connections between the slide-bars and rake for dumping the latter.

8. In a horse-rake, an axle, a rake-head carried by the axle, longitudinally-movable members adapted to engage the wheels of the axle for dumping the rake, means for locking the rake in lowered position, and means operated by the movable members for releasing the locking means whereby to effect the dumping of the rake.

9. In a horse-rake, an axle, bearing-clips secured to the axle, a rake-head pivotally mounted in said bearing-clips, and means engaging the clips for locking the terminals of the rake-head in the bearing of said clips.

10. In a horse-rake, an axle, bearing-clips secured to the axle and provided with oppositely-disposed loops, a rake-head having each of its terminals journaled in one of the loops of each clip, and bars slidably mounted in the opposite loop of each clip and adapted to engage the axle-wheels for automatically dumping the rake.

11. In a horse-rake, an axle, a tongue secured thereto, bearing-clips carried by the axle and provided with oppositely-disposed loops, a rake-head having each of its terminals journaled in one of the loops of each clip, bars slidably mounted in the opposite loop of said clip and adapted to engage the axle-wheels for automatically dumping the rake, braces connecting the axle and tongue and rods extended between the clips and braces.

12. In a horse-rake, an axle, a tongue secured to the axle, a rake-head carried by the axle, bell-crank levers pivoted to the axle, slide-bars pivoted to the bell-crank levers and operatively connected with the rake-head, said slide-bars being adapted to engage the axle-wheels to effect automatically the dumping of the rake, a spring interposed between the bell-crank levers, and an operating-lever connected to the bell-crank levers for actuating the slide-bars.

13. In a horse-rake, an axle, a rake-head secured to the axle, bell-crank levers pivoted to the axle, slide-bars operatively connected with the rake-head, and bell-crank levers respectively, and adapted to engage the wheels of the axle for automatically dumping the rake, a spring interposed between the bell-crank levers, and an operating-lever for actuating the link-and-lever connection with said bell-crank levers.

14. In a horse-rake, an axle, a rake-head pivotally mounted on the axle, slide-bars mounted for longitudinal movement on the axle, bell-crank levers operatively connected with the slide-bars, a connection between the bell-crank levers and rake-head, and a lever operatively connected with the bell-crank levers for moving the slide-bars into engagement with the axle-wheels thereby to effect the dumping of the rake.

15. In a horse-rake, an axle, a tongue secured thereto, a rake-head pivotally mounted on the axle, braces extending between the tongue and axle, slide-bars operatively connected with the rake-head and provided with terminal cranks adapted to engage the wheels of the axle for automatically dumping the rake, a hand-operated lever, and a link-and-lever connection between the hand-lever and rake-head for dumping the latter independently of the automatic dumping mechanism.

In testimony that I claim the foregoing as my own I have hereto affixed my signature in the presence of two witnesses.

EATON DAWSON BOND.

Witnesses:
N. R. NUCKOLLS,
ERNEST ELSTON.